(12) United States Patent
Olarig et al.

(10) Patent No.: US 12,174,776 B2
(45) Date of Patent: *Dec. 24, 2024

(54) SYSTEM AND METHOD FOR SUPPORTING MULTI-MODE AND/OR MULTI-SPEED NON-VOLATILE MEMORY (NVM) EXPRESS (NVMe) OVER FABRICS (NVMe-oF) DEVICES

(71) Applicant: SAMSUNG ELECTRONICS CO., LTD., Suwon-si (KR)

(72) Inventors: Sompong Paul Olarig, Pleasanton, CA (US); Fred Worley, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,369

(22) Filed: May 21, 2021

(65) Prior Publication Data

US 2021/0279198 A1 Sep. 9, 2021

Related U.S. Application Data

(63) Continuation of application No. 16/007,949, filed on Jun. 13, 2018, now Pat. No. 11,016,924.

(Continued)

(51) Int. Cl.
*G06F 13/42* (2006.01)
*G06F 3/06* (2006.01)

(52) U.S. Cl.
CPC ........ *G06F 13/4221* (2013.01); *G06F 3/0611* (2013.01); *G06F 3/0655* (2013.01); *G06F 3/0679* (2013.01); *G06F 2213/0026* (2013.01)

(58) Field of Classification Search
CPC .............. G06F 13/4221; G06F 3/0679; G06F 3/0655; G06F 3/0611; G06F 2213/0026; G06F 3/0658; G06F 3/0607

(Continued)

(56) References Cited

U.S. PATENT DOCUMENTS 6,052,738 A 4/2000 Muller et al.
7,573,940 B2 8/2009 Connor et al.
(Continued)

FOREIGN PATENT DOCUMENTS

CN 1968203 A 5/2007
CN 104683430 A 6/2015
(Continued)

OTHER PUBLICATIONS

Fang, Chin, "Using NVMe Gen3 PCIe SSD Cards in High-density Servers for High-performance Big Data Transfer Over Multiple Network Channels", SLAC National Accelerator Laboratory, SLAC-TN-15-001, Feb. 7, 2015, pp. 1-17, Stanford University, Stanford, CA.

(Continued)

*Primary Examiner* — Idriss N Alrobaye
*Assistant Examiner* — Henry W Yu
(74) *Attorney, Agent, or Firm* — Lewis Roca Rothgerber Christie LLP

(57) ABSTRACT

According to some example embodiments, a system includes: at least one motherboard; at least one baseboard management controller (BMC); a mid-plane; and at least one storage device, wherein the at least one storage device is configured to operate in a first mode or a second mode based on a first input received from the at least one motherboard or the at least one BMC via a plurality of device ports over the mid-plane; and when operating in the second mode, the at least one storage device is configured to operate in a first speed from a plurality of operating speeds based on a second input received from the mid-plane via the plurality of device ports.

21 Claims, 12 Drawing Sheets

Related U.S. Application Data

(60) Provisional application No. 62/637,340, filed on Mar. 1, 2018.

(58) Field of Classification Search
USPC .......................... 710/10, 11, 14, 33, 60, 105
See application file for complete search history.

(56) References Cited

U.S. PATENT DOCUMENTS

| | | | |
|---|---|---|---|
| 8,508,928 | B2 | 8/2013 | Killen et al. |
| 9,008,129 | B2 | 4/2015 | Diab et al. |
| 9,015,353 | B2 * | 4/2015 | Shapiro .................. G06F 16/168 710/305 |
| 9,311,110 | B2 | 4/2016 | Tamir et al. |
| 9,565,269 | B2 | 2/2017 | Malwankar et al. |
| 9,678,666 | B2 | 6/2017 | Fanning et al. |
| 9,785,356 | B2 * | 10/2017 | Huang .................. H04L 67/1004 |
| 10,140,063 | B2 | 11/2018 | Worley et al. |
| 10,210,123 | B2 | 2/2019 | Olarig et al. |
| 10,379,745 | B2 | 8/2019 | Vyshetsky et al. |
| 10,387,353 | B2 | 8/2019 | Olarig et al. |
| 10,503,679 | B2 | 12/2019 | Huang |
| 10,666,698 | B1 * | 5/2020 | Joliveau .................. H04L 65/752 |
| 10,691,628 | B2 | 6/2020 | Lin et al. |
| 2003/0191883 | A1 | 10/2003 | April |
| 2004/0246615 | A1 | 12/2004 | Kang |
| 2006/0258231 | A1 | 11/2006 | Cox |
| 2009/0269052 | A1 | 10/2009 | Dickens et al. |
| 2010/0306434 | A1 * | 12/2010 | Dube .................... G06F 3/0683 710/305 |
| 2013/0080697 | A1 | 3/2013 | Dhandapani et al. |
| 2014/0008370 | A1 | 1/2014 | Judd |
| 2014/0211862 | A1 | 7/2014 | Moghe et al. |
| 2014/0215244 | A1 * | 7/2014 | Hong .................... G06F 1/3234 713/323 |
| 2014/0269738 | A1 * | 9/2014 | Pierson .................. H04L 49/101 370/400 |
| 2014/0372678 | A1 | 12/2014 | Moon et al. |
| 2015/0006663 | A1 | 1/2015 | Huang |
| 2015/0019918 | A1 | 1/2015 | Li |
| 2015/0261446 | A1 | 9/2015 | Lee |
| 2015/0277512 | A1 | 10/2015 | Davis et al. |
| 2015/0351277 | A1 | 12/2015 | Frank et al. |
| 2016/0191403 | A1 * | 6/2016 | Peng .................... H04L 1/0007 370/235 |
| 2016/0259754 | A1 | 9/2016 | Ping |
| 2016/0357698 | A1 | 12/2016 | Huang |
| 2016/0363966 | A1 | 12/2016 | Davis et al. |
| 2017/0060443 | A1 * | 3/2017 | Roh .................... G06F 3/0613 |
| 2017/0168943 | A1 | 6/2017 | Chou et al. |
| 2017/0177216 | A1 | 6/2017 | Freyensee et al. |
| 2017/0212858 | A1 | 7/2017 | Chu et al. |
| 2017/0220505 | A1 | 8/2017 | Breakstone et al. |
| 2017/0300445 | A1 * | 10/2017 | McKnight ........... G06F 13/4068 |
| 2017/0357610 | A1 | 12/2017 | Thompson |
| 2017/0364307 | A1 | 12/2017 | Lomelino et al. |
| 2017/0371814 | A1 | 12/2017 | Stuhlsatz |
| 2018/0032462 | A1 | 2/2018 | Olarig et al. |
| 2018/0032463 | A1 | 2/2018 | Olarig et al. |
| 2018/0032471 | A1 | 2/2018 | Olarig |
| 2018/0048592 | A1 | 2/2018 | Worley et al. |
| 2018/0067685 | A1 | 3/2018 | Deng et al. |
| 2019/0245924 | A1 | 8/2019 | Li |
| 2019/0342177 | A1 | 11/2019 | Shah et al. |

FOREIGN PATENT DOCUMENTS

| | | |
|---|---|---|
| CN | 104714913 A | 6/2015 |
| CN | 104951384 A | 9/2015 |
| CN | 105556930 A | 5/2016 |
| CN | 106502593 A | 3/2017 |
| CN | 107305534 A | 10/2017 |
| CN | 107659518 A | 2/2018 |
| JP | 2017-201512 A | 11/2017 |
| JP | 2018-18514 A | 2/2018 |
| KR | 10-2016-0106493 A | 9/2016 |
| KR | 10-2018-0012201 | 2/2018 |
| TW | 201304471 A1 | 1/2013 |

OTHER PUBLICATIONS

NVM Express, "NVM Express over Fabrics", 3 NVM Express Starndard Revision 1.0, pp. 1-49, Jun. 5, 2016.

Guz, Zvika, et al. "NVMe-over-Fabrics Performance Characterization and the Path to Low-Overhead Flash Disaggregation", 10th ACM International Systems and Storage Conference (SYSTOR'17), May 22-24, 2017, pp. 1-9, Haifa, Israel.

US Notice of Allowance dated Oct. 18, 2022, issued in U.S. Appl. No. 17/316,596 (7 pages).

Pan, Yong-jun, et al., "Design of NVMe Driver Based on VxWorks6. 8," Avionics Technology, vol. 48, No. 4, Dec. 2017, pp. 32-37.

Final Office Action for U.S. Appl. No. 16/033,141 dated Jun. 18, 2020, 16 pages.

Office Action for U.S. Appl. No. 16/033,141 dated Feb. 4, 2020, 15 pages.

Office Action for U.S. Appl. No. 16/033,141 dated Sep. 1, 2020, 16 pages.

Office Action for U.S. Appl. No. 17/316,596 dated Jun. 23, 2022, 11 pages.

SNIA SFF-TA-1008 Specification for Enterprise and Datacenter SSD 3 Form Factor; Revision 1.0, Mar. 30, 2018, 18 pages.

Chinese Office Action for CN Application No. 201910053414.3 dated Feb. 29, 2024, 10 pages.

Chinese Office Action dated Aug. 6, 2024, issued in corresponding Chinese Patent Application No. 201910053414.3 (11 pages).

* cited by examiner

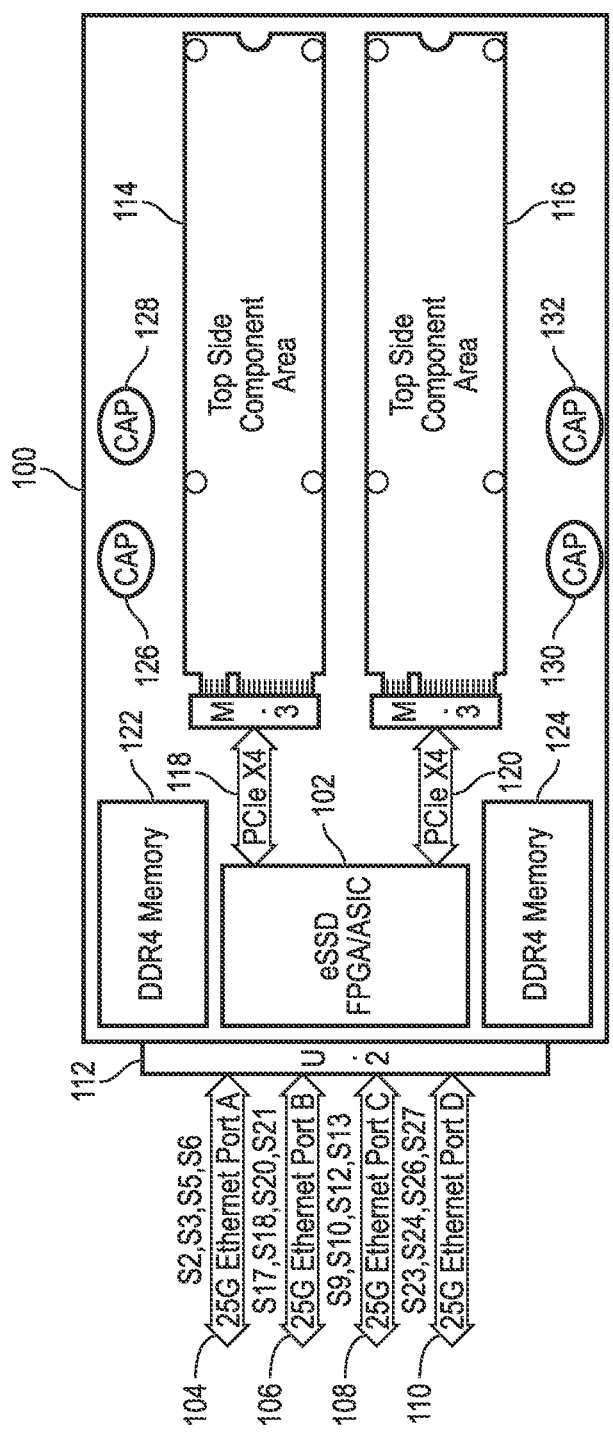
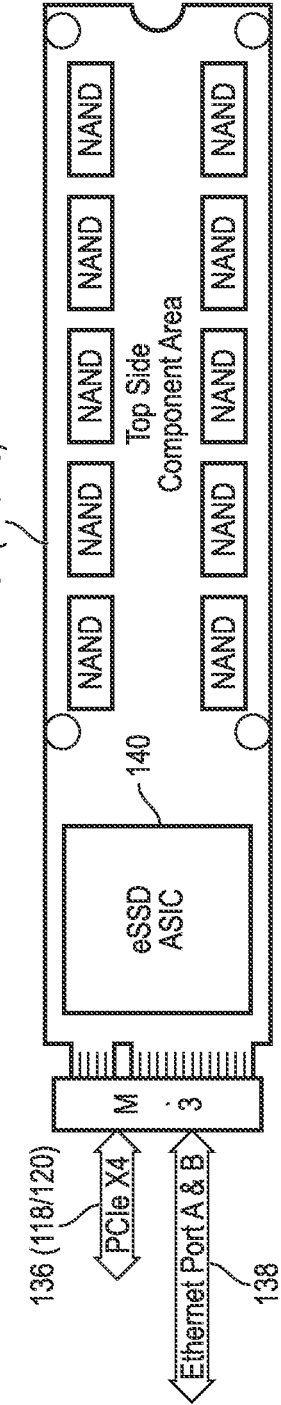
FIG. 1A
FIG. 1B

| Operation Mode | SAS0 | SAS1 | PCIe0 | PCIe1 | PCIe2 | PCIe3 | Chassis Type Pin E6 (lo=NVMe, hi=NVMe-oF) | DualPortEN# Pin E25 of U.2 |
|---|---|---|---|---|---|---|---|---|
| Ethernet Ports disabled Single Port NVMe | Not used | Not used | Used as single X4 | Used as single X4 | Used as single X4 | Used as single X4 | NVMe | high |
| Ethernet Ports disabled Dual Port NVMe | Not used | Not used | PCIe Port A | PCIe Port A | PCIe Port B | PCIe Port B | NVMe | Low |
| 10G (single and dual port) | Ethernet A | | Control Port A X1 | Ethernet B | | Control Port B X1 | NVMe-oF | High/Low |
| 25G (single and dual port) | Ethernet A | | Control Port A X1 | Ethernet B | | Control Port B X1 | NVMe-oF | High/Low |
| 50G (single and dual port) | Ethernet A | Ethernet C | Control Port A X1 | Ethernet B | Ethernet D | Control Port B X1 | NVMe-oF | High/Low |
| 100G (single port only) | Ethernet A | Ethernet C | Control Port A X1 | Ethernet B | Ethernet D | Control Port B X1 | NVMe-oF | High/Not supported |

FIG. 3

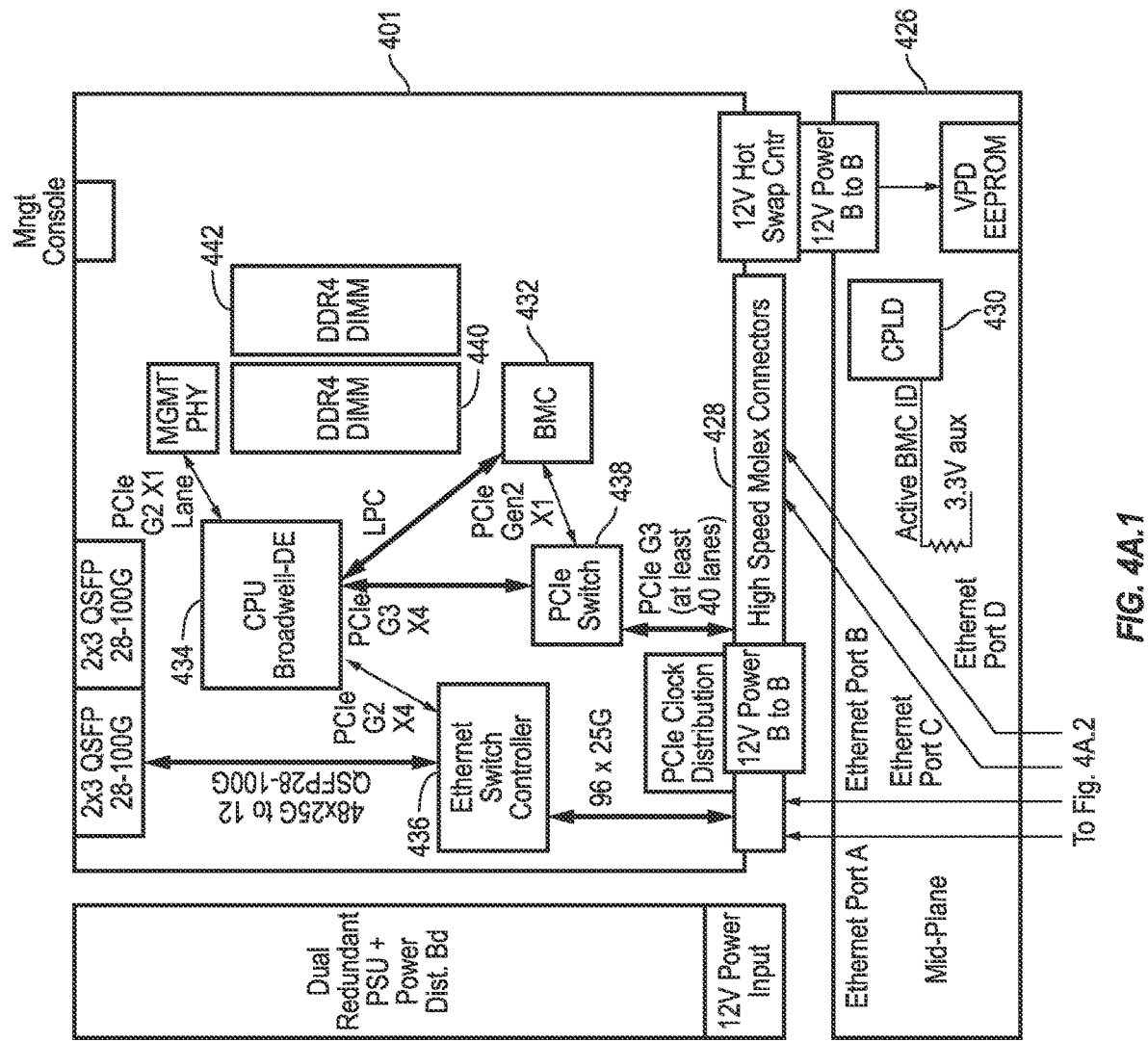
FIG. 4A.1

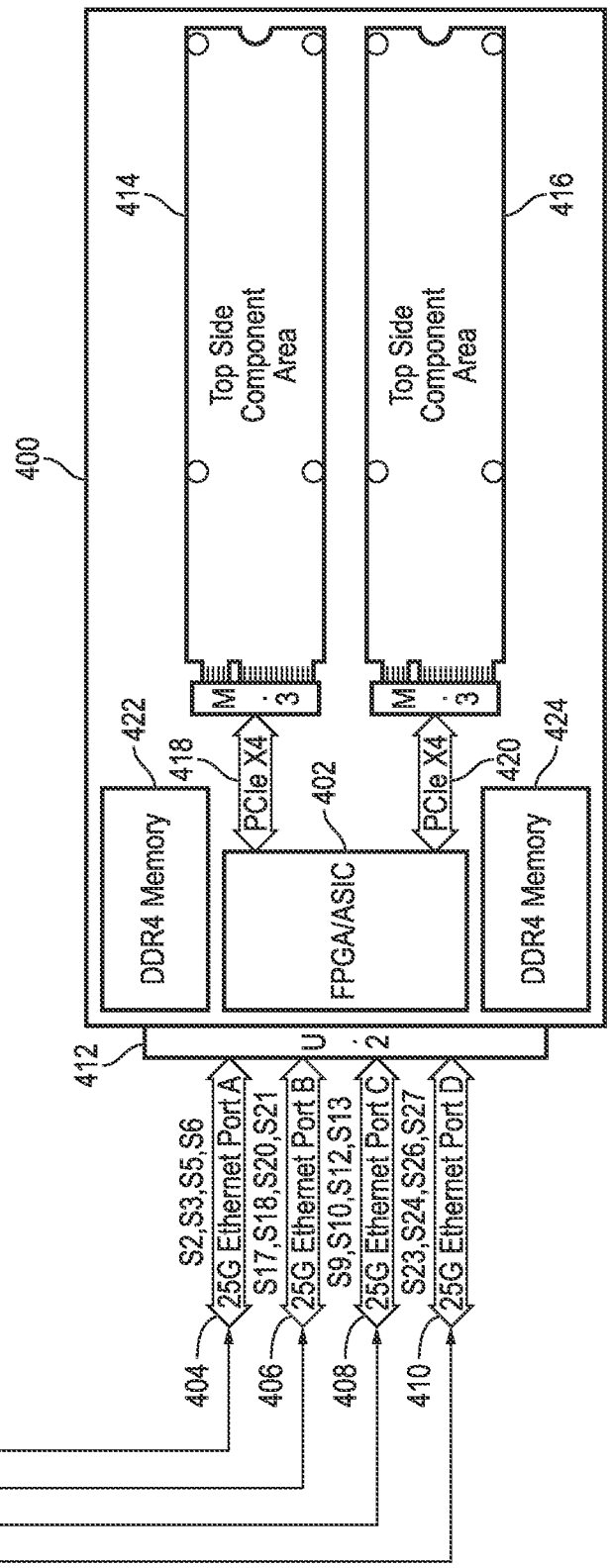
FIG. 4A.2

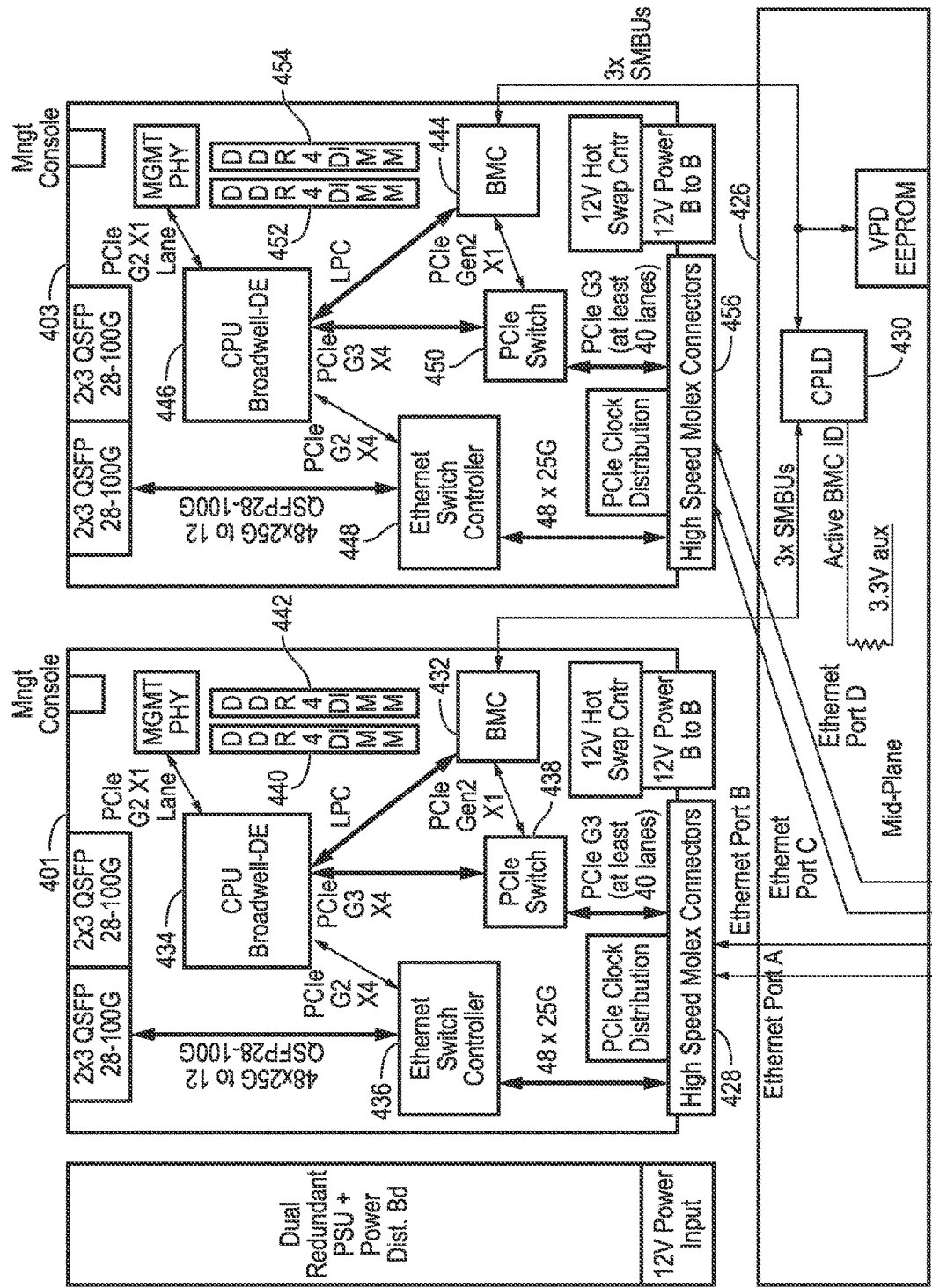
FIG. 4B.1

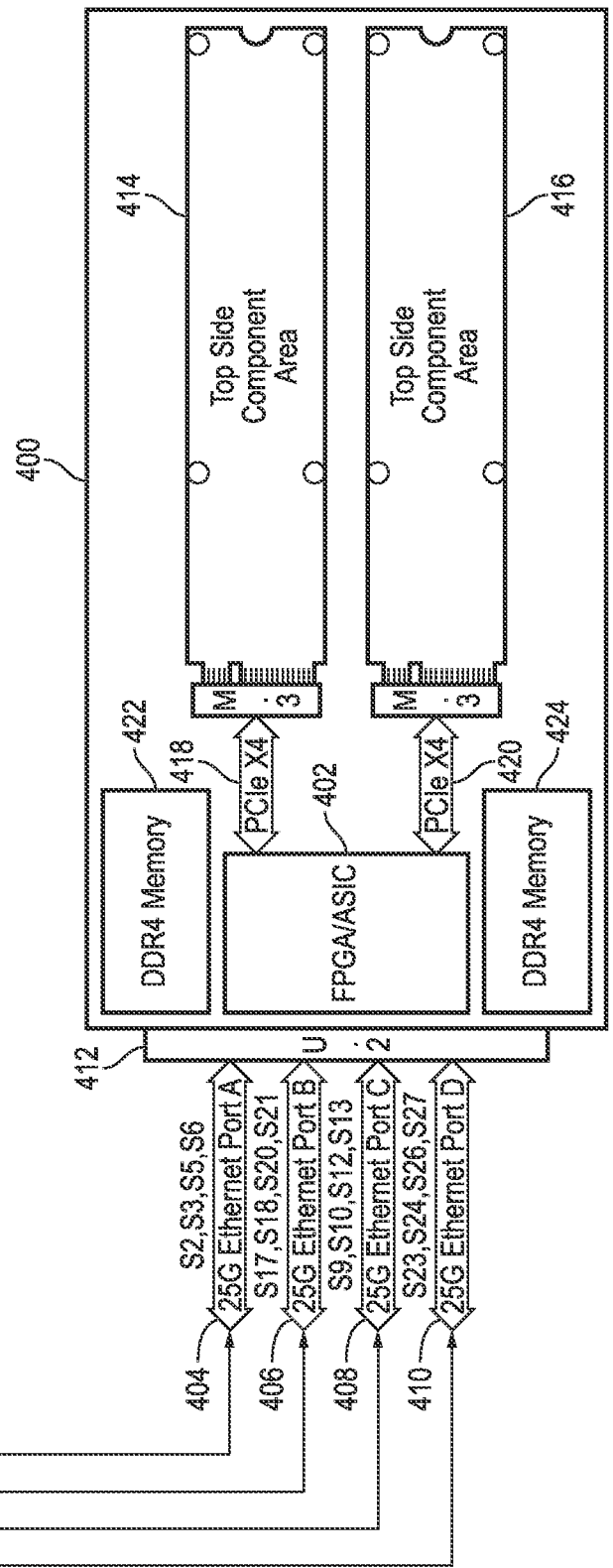
FIG. 4B.2

SYSTEM AND METHOD FOR SUPPORTING MULTI-MODE AND/OR MULTI-SPEED NON-VOLATILE MEMORY (NVM) EXPRESS (NVMe) OVER FABRICS (NVMe-oF) DEVICES

CROSS-REFERENCE TO RELATED APPLICATION(S)

This Patent Application is a continuation of U.S. patent application Ser. No. 16/007,949, filed Jun. 13, 2018, now U.S. Pat. No. 11,016,924, which claims priority to and the benefit of U.S. Provisional Patent Application Ser. No. 62/637,340, filed on Mar. 1, 2018 and entitled "FPGA+SSD SYSTEM METHOD FOR SUPPORTING 50G AND 100G ETHERNET," the entire contents of all of which are hereby expressly incorporated by reference.

FIELD

One or more aspects of embodiments according to the present invention relate to network-attached devices, more particularly, to a system and method for supporting multi-mode and/or multi-speed Non-volatile memory (NVM) express (NVMe) over fabrics (NVMe-oF) devices.

BACKGROUND

With NVM-oF configurations, e.g., configurations using Ethernet-attached NVMe solid state drives (SSDs), improving Ethernet and SSD cost and performance may be challenging. For example, Ethernet speed has increased with the advent of 50G/100G technology, while SSD performance may depend on the Peripheral Component Interconnect Express (PCIe) interface and NANDs technology. Fabric-attached SSDs may present additional unique design challenges for supporting erasure code data protection because each device may provide point-to-point connectivity.

Thus, a storage device capable of supporting both NVMe and NVMe-oF protocols and operating in different Ethernet speeds, is desirable.

The above information disclosed in this Background section is only for enhancement of understanding of the background of the invention and therefore it may contain information that does not constitute prior art.

SUMMARY

Aspects of embodiments of the present disclosure are directed toward a system including: at least one motherboard; at least one baseboard management controller (BMC); a mid-plane; and at least one storage device, wherein the at least one storage device is configured to operate in a first mode or a second mode based on a first input received from the at least one motherboard or the at least one BMC via a plurality of device ports over the mid-plane; and when operating in the second mode, the at least one storage device is configured to operate in a first speed from a plurality of operating speeds based on a second input received from the mid-plane via the plurality of device ports.

In one embodiment, the at least one storage device includes a plurality of solid state drives (SSDs) in communication with at least one field programmable gate array (FPGA) via a connector and at least one bus. In one configuration, the connector is a SSD connector and the at least one bus is a peripheral component interconnect express (PCIe) bus.

In another embodiment, the first mode and the second mode of the at least one storage device are a non-volatile memory express (NVMe) mode and an NVMe over fabrics (NVMe-oF) mode, respectively. In one configuration, the first input is controlled by using a physical pin on a chassis of the at least one motherboard or by an in-band command from the at least one BMC.

In one embodiment, the second input is controlled by using two general-purpose input/output (GPIO) pins controlled by the at least one BMC or a local central processing unit (CPU) of the at least one motherboard, or one or more internal registers inside a field programmable gate array (FPGA) of the at least one storage device. In another embodiment, the plurality of operating speeds of the at least one storage device are two or more speeds above 10G (e.g., between 10G and 100G or between 10G and a speed above 100G).

In an aspect, the plurality of device ports are connected to the at least one storage device via a U.2 connector and the storage device is configured to operate in a high-availability (HA) mode or a non-HA mode. In another aspect, the at least one storage device supports via the U.2 connector two Serial Attached Small Computer System Interface (SAS) ports and up to four peripheral component interconnect express (PCIe) X4 lanes of a PCIe X4 bus, wherein the two SAS ports are used as Fabric attached ports, and wherein the Fabric attached ports include Ethernet ports, Fibre-channel ports, and InfiniBand ports.

In one configuration, when operating in the second mode, the at least one storage device supports, via the U.2 connector, two PCIe X4 lanes of the four PCIe X4 lanes for control plane for two Fabric attached ports and remaining two PCIe X4 lanes of the four PCIe X4 lanes as additional Fabric attached ports. In another configuration, the at least one storage device includes a first storage device and a second storage device, wherein at a first time, the first storage device and/or the second storage device operate in the first mode or the second mode in the first speed or a second speed from the plurality of operating speeds.

According to an embodiment of the present invention there is provided a method including: receiving, at a storage device, a first input, wherein the first input is received at the storage device from at least one motherboard or a baseboard management controller (BMC) via a plurality of device ports over a mid-plane; determining, by the storage device, based on the first input received at the storage device, whether to operate in a first operating mode or in a second operating mode; when operating in the second operating mode, receiving, at the storage device, a second input from the mid-plane via the plurality of device ports; and selecting, by the storage device, an operating speed of the storage device from a plurality of operating speeds based on the second input.

In one embodiment, the first operating mode and the second operating mode of the storage device are a non-volatile memory express (NVMe) mode and a NVMe over fabrics (NVMe-oF) mode. In another embodiment, the first input is controlled by using a physical pin on a chassis of the at least one motherboard or by an in-band command from the BMC.

In an aspect, the second input is controlled by using two general-purpose input/output (GPIO) pins controlled by the BMC or a local central processing unit (CPU) of the at least one motherboard, or one or more internal registers inside a field programmable gate array (FPGA) of the storage device.

In another aspect, wherein the plurality of operating speeds of the storage device are two or more speeds above 10G.

According to another embodiment of the present invention there is provided a storage device including: a plurality of solid state drives (SSDs) in communication with at least one field programmable gate array (FPGA) via a first connector and at least one bus, wherein the storage device is configured to operate in a first mode or a second mode based on a first input received via a second connector, wherein when operating in the second mode, the storage device is configured to operate in a first speed from a plurality of operating speeds based on a second input received via the second connector.

In an aspect, the first input is received from a motherboard or a baseboard management controller (BMC) of a switch via a plurality of device ports over a mid-plane and the second input is received from the mid-plane via the plurality of device ports, wherein the first input is controlled by using a physical pin on a chassis of the motherboard or by an in-band command from the BMC and the second input is controlled by using two general-purpose input/output (GPIO) pins controlled by the BMC or a local central processing unit (CPU) of the motherboard, or one or more internal registers inside the FPGA.

In another aspect, the first connector is a SSD connector, the at least one bus is a peripheral component interconnect express (PCIe) bus, the second connector is a U.2 connector, the first mode and the second mode of the storage device are a non-volatile memory express (NVMe) mode and a NVMe over fabrics (NVMe-oF) mode, respectively, and the plurality of operating speeds of the storage device are two or more speeds above 10G.

In one configuration, at a first time, a first SSD and/or a second SSD of the plurality of SSDs operate in the first mode or the second mode in the first speed or a second speed from the plurality of operating speeds.

BRIEF DESCRIPTION OF THE DRAWINGS

These and other features of some example embodiments of the present invention will be appreciated and understood with reference to the specification, claims, and appended drawings, wherein:

FIG. 1A illustrates a configuration of an NVMe-oF device, according to some example embodiments of the present invention;

FIG. 1B illustrates a block diagram of an example SSD, according to some example embodiments of the present invention;

FIG. 3 illustrates an example table showing example use of an U.2 connector according to the configuration of an example multi-mode NVMe-oF device, according to some example embodiments of the present invention;

FIG. 4A (FIG. 4A.1 and FIG. 4A.2) illustrates a block diagram of an example NVMe-oF device operating in a non-high availability (non-HA), according to some example embodiments of the present invention;

FIG. 4B (FIG. 4B.1 and FIG. 4B.2) illustrates a block diagram of the example NVMe-oF device operating in a high-availability (HA) mode, according to some example embodiments of the present invention;

DETAILED DESCRIPTION

Figure 2:
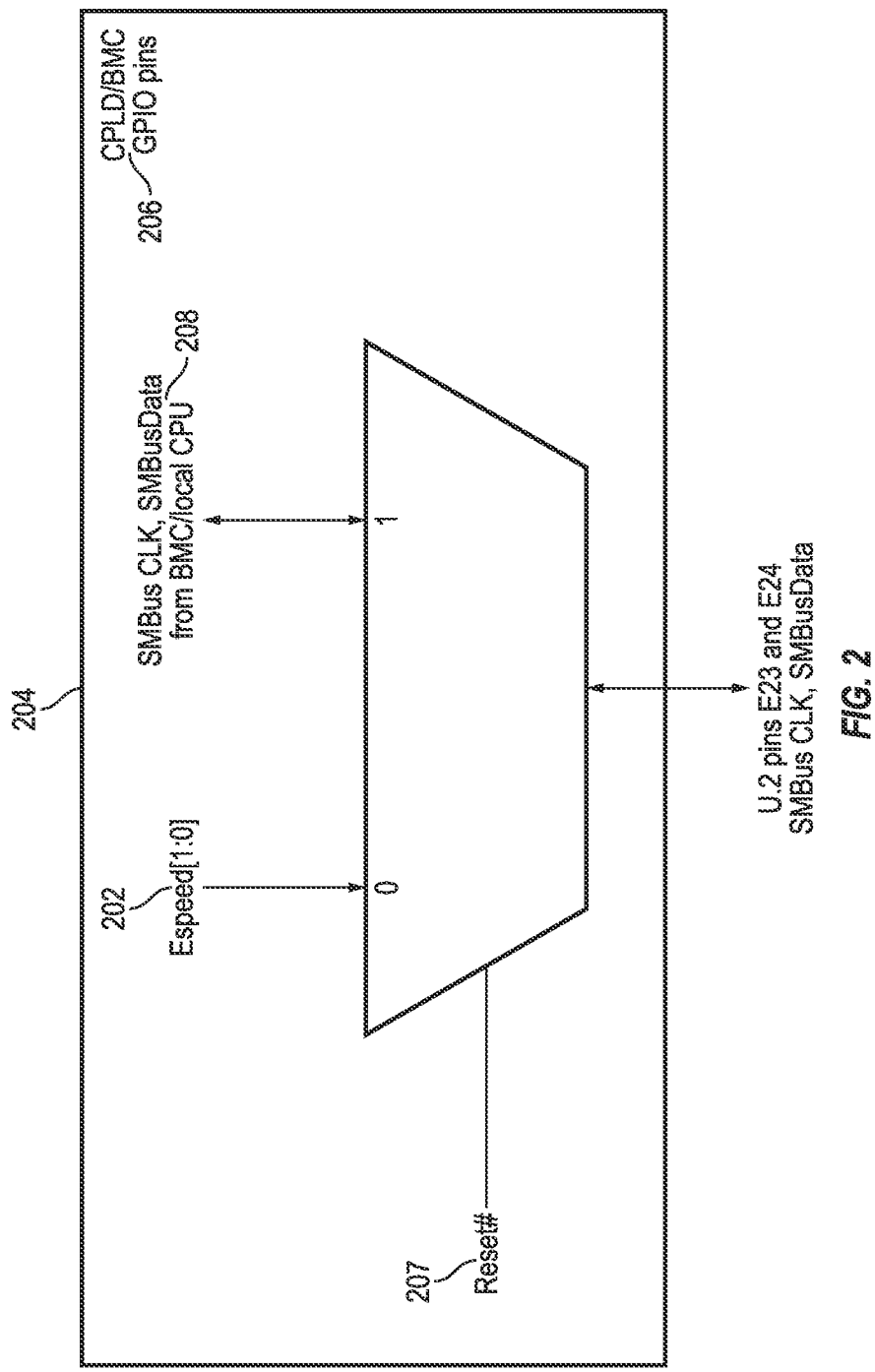
FIG. 2 illustrates a block diagram of a mid-plane or complex programmable logic device (CPLD), according to some example embodiments of the present invention.

The detailed description set forth below in connection with the appended drawings is intended as a description of some example embodiments of a system and method for supporting multi-mode and/or multi-speed NVMe-OF devices provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

NVMe is a standard that defines a register-level interface for host software to communicate with a non-volatile memory subsystem (e.g., a SSD) over a PCIe bus. NVMe is an alternative to the Small Computer System Interface (SCSI) standard for connecting and transferring data between a host and a peripheral target storage device or system. PCIe-connected NVMe SSDs allow applications to talk directly to storage.

The physical connection of the NVMe is based on a PCIe bus. A typical Ethernet SSD (eSSD) has a U.2 connector to interface with a system via a mid-plane over the PCIe bus. U.2 (SFF-8639) is a computer interface for connecting SSDs to a computer. A U.2 connector can support one Serial Advanced Technology Attachment (SATA) port, two Serial Attached SCSI (SAS) ports or up to four lanes (X4) of parallel I/O in PCIe SSDs. The U.2 connector is standardized for NVMe and supports PCIe 3.0 X4, providing five times the speed of a typical SATA SSD.

NVM-oF is an extension to the NVMe standard enabling operation over a variety of fabrics (or interconnects) other than PCIe. Herein, the term "fabric", represents a network topology in which network nodes can pass data to each other through a variety of interconnecting protocols, ports, and switches. For example, Ethernet-attached SSDs may attach directly to a fabric, and in this case the fabric is the Ethernet.

NVMe-oF enables the use of alternate transports to PCIe that extend the distances across which an NVMe host device and NVMe storage drive or subsystem can connect. Therefore, NVMe-oF is a technology specification designed to enable nonvolatile memory express message-based commands to transfer data between a host computer and a target solid-state storage device (e.g., eSSD or NVMe-oF device) or system over a network, such as Ethernet, Fibre Channel (FC) or InfiniBand. When configured to support the NVMe-oF standard, a system can support various fabrics including not only Ethernet, but also, Fibre Channel, InfiniBand, and other network fabrics. For example, eSSDs may attach directly to a fabric, and in this case the fabric is the Ethernet. An eSSD may refer to an SSD that may support the NVMe-oF protocols. For the convenience of illustration, the following examples and embodiments can show an Ethernet-attached NVMe-oF devices. However, it is noted that any other type of NVMe-OF devices can be used without deviating from the scope of the present disclosure.

As mentioned above, the physical connection of the NVMe is based on a PCIe bus. In recent times, with the advent of PCIe 4.0, bandwidth mismatch may be higher than PCIe 3.0. A single 25G Ethernet does not have enough bandwidth to keep up with the backend by X4 PCIe 4.0 (up to 8 GB/s) from the SSD. A 50G or 100G Ethernet provides a better match for the X4 PCIe 4.0 from the SSD. Therefore, embodiments of the present invention may include a storage device (e.g., eSSD) that is capable of supporting both NVMe and NVMe-oF protocols, and when in the NVMe-oF mode, the storage device may be able to operate in different Ethernet speeds from 10G up to 100G, without any changes to their hardware.

Further, embodiments of the present invention may enable any platform system to support different types of NVMe-OF devices from different suppliers. By using common building blocks such as switch board, mid-plane and Ethernet SSDs, the eco-system providers may be able to go to market faster than the existing systems and offer various price/performance products to satisfy various customers. Some example embodiments may further enable a common system platform that is capable of supporting NVMe-OF devices with standard U.2 such as PM1725a or PM1735 and new emerging such as M.3 SSDs. In one configuration, the M.3 SSDs may also be called NGSFF based SSDs.

The different embodiments of the present system provide a single platform and common building blocks that can support both NVMe and NVMe-OF devices, and when in the NVMe-oF mode, the system may be able to operate in different Ethernet speeds from 10G up to 100G, without any changes to their hardware. The common building blocks that may support both NVMe and NVMe-OF devices may include a switch board, a mid-plane, and eSSDs. The present system may scale linearly by adding more similar devices and/or chassis. The present system may also provide a common system platform which is capable of supporting NVMe-OF devices with standard U.2 connector such as PM1725a or PM1735 and M.3 or NGSFF based SSDs. The different configurations of the present system may also be compatible with technologies advancement such as 50G and 100G Ethernet and PCIe 4.0. In particular, the different configurations of the present application provide a system that can support both the NVMe and NVMe-oF protocols, and various types of fabric-attached SSDs (e.g., eSSDs). Further, the different configurations of the present application may provide a disclosure regarding how the chassis and the device (e.g., eSSD) coordinate for the device to understand where it has been deployed and what personality it should adopt as a result of its deployment in a particular place in the data set.

The fabric-attached SSD (eSSD) disclosed herein is a single common device that may be used in multiple systems compatible with NVMe and NVMe-OF standards. Ethernet SSDs may use U.2 connectors to interface with the host device via the mid-plane. The U.2 connectors may support 25 Gbps (100G-KR4) Ethernet. The eSSD disclosed herein may be a device that may be used in multiple systems compatible with NVMe and NVMe-OF standards. As such, the fabric-attached SSD (eSSD) may also be referred to as a multi-mode NVMe-oF device. The multi-mode NVMe-oF device may support either NVMe or NVMe-OF standard by detecting product information from a known location (e.g., chassis type pin E6 of the motherboard or the mid-plane). For example, a defined signal (e.g., a mode signal) on the U.2 connector may indicate to the drive whether to operate in NVMe or NVMe-oF mode. If present in NVMe chassis, then the X4 lane PCIe of the U.2 connector will be driven by the PCIe engine. In this case, the device will disable the Fabric attached ports (e.g., Ethernet ports, Fibre-channel ports, or InfiniBand ports) and all NVMe protocols and functionalities are supported or enabled. If present in an NVMe-OF chassis, then the Fabric attached ports will use only the unused SAS pins.

FIG. 1A illustrates a configuration of an NVMe-oF device 100. The NVMe-OF device 100 of FIG. 1A includes a FPGA 102, a first M.3 format SSD 114, a second M.3 format SSD 116, two double data rate fourth-generation (DDR4) memories (122 and 124), and four capacitors (126, 128, 130, and 132). The NVMe-oF device 100 is also connected to a U.2 connector 112, and via the U.2 connector 112, the U.2 connector 112 may support two SAS ports (SAS0 and SAS1) and up to four PCIe X4 lanes of a PCIe X4 bus. The two SAS ports (SAS0 and SAS1) may be used as Ethernet ports by the NVMe-OF device 100. The NVMe-OF device 100 may be able to operate in different Ethernet speeds from 10G up to 100G, without any changes to the hardware.

FIG. 1B illustrates a block diagram of an example M.3 format SSD 134, according to one embodiment. M.3 format SSD 134 may be SSD 114 or SSD 116 of FIG. 1A. The new form factor 1 (NF1) of the M.3 format SSD 134 may accommodate two rows of NAND flash packages, and thus maximize capacities of modular SSDs. The M.3 format SSD 134 may be connected to a FPGA via a PCIe X4 bus 136. The FPGA may be the FPGA 102 of FIG. 1A and the PCIe X4 bus 136 may be one of the PCIe X4 busses 118 or 120 of FIG. 1A. The M.3 format SSD 134 may also accommodate at least one optional Ethernet port 138 (Ethernet port A and/or Ethernet port B) using the unused or reserved (e.g., high speed) pins of M.2 connector used for connecting to the FPGA (e.g., FPGA 102 of FIG. 1A). The at least one Ethernet port 138 may enable the M.3 format SSD 134 to operate in NVMe-oF mode.

In some embodiments, the M.3 format SSD 134 may conform to a 2.5 inch hard drive form-factor (or small form factor (SFF)) standard. In other embodiments, the M.3 format SSD 134 may conform to a standard PCIe card form factor, e.g., a full-height, full length (FH-FL) card outline, or a full-height, half length (FH-HL) outline. The M.3 format SSD 134 may also include a controller, buffer memory, and flash memory. The controller may execute software, NVMe commands, and/or firmware, stored, for example, in the buffer memory, or in read-only memory in the controller (or separate from the controller). In FIG. 1B, the eSSD ASIC 140 is an enhanced SSD controller which contains Flash Translation Layer (FTL) and Flash controllers.

Returning back to FIG. 1A, the NVMe-oF device 100 may be configured to operate in either NVMe mode or NVMe-oF mode. In the NVMe-oF mode, the NVMe-oF device 100 may configure two PCIe lanes (PCIe 1 and PCIe 2) as Ethernet port 106 (Ethernet port B) and Ethernet port 110 (Ethernet port D). The NVMe-oF device 100 may further configure the two SAS ports (SAS0 and SAS1) as Ethernet port 104 (Ethernet port A) and Ethernet port 108 (Ethernet port C). The first 25G Ethernet port 104 may be connected at pins S2, S3, S5, and S6 of the U.2 connector 112, the second 25G Ethernet port 106 may be connected at pins S17, S18, S20, and S21 of the U.2 connector 112, the third 25G Ethernet port 108 may be connected at pins S9, S10, S12, and S13 of the U.2 connector 112, and the fourth 25G Ethernet port 110 may be connected at pins S23, S24, S26, and S27 of the U.2 connector 112. When in the NVMe-OF mode, the NVMe-OF device 100 may be able to operate in different Ethernet speeds from 10G up to 100G.

In FIG. 1A, when the NVMe-OF device 100 is configured in NVMe-OF mode, the FPGA 102 may provide an interface between the four 25 Gbps Ethernet ports (104, 106, 108, 110) and the two M.3 format SSDs (114, 116). The four 25G Ethernet ports (104, 106, 108, 110) may be connected to a motherboard over a mid-plane depending on the mode of operation of the NVMe-oF device 100. In one configuration, the motherboard may include one or more switching elements, one or more memory elements, one or more I/O elements, or the like. The FPGA 102 interfaces with the first M.3 format SSD 114 via a first PCIe X4 bus 118 and the FPGA 102 interfaces with the second M.3 format SSD 116 via a second PCIe X4 bus 120. The first PCIe X4 bus 118 and the second PCIe X4 bus 120 may be connected to the first M.3 format SSD 114 and the second M.3 format SSD 116 over their respective M.2 connectors. In this case, the unused or reserved (e.g., high speed) pins of M.2 connectors attached to the SSDs 114 and 116, may be used for Ethernet connection. In this mode, the FPGA 102 may function as an NVMe-OF target. The NVMe-oF target implemented on the eSSD ASIC/FPGA 102 provides all network and storage protocol processing which obviates the need for an X86-based central processing unit (CPU) on a motherboard in the target device. For an NVMe-OF based system, an X86-based CPU on a motherboard is no longer required to move data between an initiator (e.g., host software) and a target device (i.e., an NVMe-oF device) because the target device is capable of moving data by itself.

In one configuration, the NVMe-oF device 100 may be configured in an NVMe mode. In the NVMe mode, the NVMe-oF device 100 may use all of the four PCIe X4 lanes (in a single port mode) to carry PCIe signals over the PCIe X4 bus. The PCI X4 bus is connected to a mid-plane, and the PCIe bus is shared between data and control signals. In an aspect, at a given time, the first M.3 format SSD 114 and the second M.3 format SSD 116 of the NVMe-oF device 100 may both operate in either NVMe mode or NVMe-oF mode. In another aspect, at a given time, the first M.3 format SSD 114 may operate in the NVMe mode and the second M.3 format SSD 116 may operate in the NVMe-oF mode. In yet another aspect, at a given time, the first M.3 format SSD 114 may operate in the NVMe-oF mode and the second M.3 format SSD 116 may operate in the NVMe mode.

The operational mode of the NVMe-OF device 100 may be self-configured or externally set using a physical pin (e.g., a presence pin (Pin E6) on the chassis of the motherboard) or by an in-band command from a baseboard management controller (BMC) of the motherboard. The manageability information retrieved through Ethernet is referred to as "in-band" information whereas the manageability information retrieved through the PCIe bus is referred to as "out-of-band" information. When configured as an NVMe-oF device, the multi-mode NVMe-oF device 100 (chassis type pin E6=low), may be configured in either the single port NVMe-OF mode or the dual port NVMe-oF mode. In the single port NVMe-OF mode, the pin E25 of U.2 connector 112 may be high and in the dual port NVMe-OF mode, the pin E25 of U.2 connector 112 may be low.

In one configuration, as shown in FIG. 2, the different operating speeds of the NVMe-oF device 100 may be accomplished by using two additional general-purpose input/output (GPIO) (ESpeed[1:0]) pins 202 located on the mid-plane or CPLD 204, which may be controlled by a BMC or local CPU of a motherboard, or internal register inside the FPGA 102 of the NVMe-oF device 100 and accessible via I2C bus connected at the pins E23 and E24 of the U.2 connector 112. In the former option, the ESpeed pins 202 are muxed with U.2 I2C pins inside the CPLD 204 and may be latched after reset 207 has been asserted (hi to lo). In one configuration, the inputs to the MUX are driven by CPLD 204 or BMC or local CPU of the motherboard. However, in some configurations, the location of the MUX is inside the CPLD 204. The number of MUXes is equal to max number of supported NVME-OF devices in the chassis. This way each device can be reset individually and independently. This approach can support hot-pluggable events (hot add and hot removal). If there is one MUX to share for all devices, then when a new device is hot inserted, it may impact the existing devices in the chassis due to the reset cycle, which may be undesirable.

In case, the CPLD 204 is controlled by the BMC or local CPU of the motherboard, the control signal from the BMC or local CPU may be received at the CPLD/BMC GPIO pins 206 at the CPLD 204. The following Table 1 illustrates the status of the ESpeed pins during different operating speeds of the NVMe-OF device 100.

TABLE 1

| Ethernet Speed | ESpeed Pin 1 | ESpeed Pin 0 |
| --- | --- | --- |
| 10 G | Hi | Hi |
| 25 G | Hi | Lo |
| 50 G | Lo | Hi |
| 100 G | Lo | Lo |

Further, the Ethernet speed is selected using SMBus 208 during power on or reset. In one configuration, a multiplexer is selected by power on or reset signal 207, and when the reset 207 is active low the multiplexer may select Espeed (0:1) 202 to the FPGA 102 and when the reset 207 is high the multiplexer may connect the SMBus 208 between each slot to the BMC on the switch board.

In one configuration, the multi-mode NVMe-OF device 100 may be configured in a single port NVMe mode, a dual port NVMe mode, a single port NVMe-oF mode, and a dual port NVMe-oF mode.

FIG. 3 shows example use of the U.2 connector 112 according to the configuration of the multi-mode NVMe-oF device 100. When configured as an NVMe device (chassis type pin E6=low), the multi-mode NVMe-oF device 100 may be configured in either the single port NVMe mode or the dual port NVMe mode. In the single port NVMe mode, the dual port EN #pin E25 of U.2 connector 112 may be asserted high. In the single port NVMe mode, the PCIe lanes 0-3 of the U.2 connector 112 are used to carry PCIe signals. In the dual port NVMe mode, the dual port EN #pin E25 of U.2 connector 112 may be asserted low. In the dual port NVMe mode, the PCIe lanes 0-3 are split into 2 by 2 lanes; the PCIe lanes 0 and 1 are used for the first port (port A), and the PCIe lanes 2 and 3 are used for the second port (port B).

In one configuration, when the multi-mode NVMe-oF device 100 is in the NVMe-OF mode, the NVMe-oF device 100 may have two X1 PCIe lanes (PCIe 0 and PCIe 3) for control plane for the first (port A) and second (port B) Ethernet ports. Such configurations may make two PCIe lanes (PCIe 1 and PCIe 2) available to be used for additional 25G Ethernet ports (Ethernet port B and D). In some configurations, when the NVMe-oF device 100 is operating in 10G (single port or dual port) or 25G (single port or dual port) speed in the NVMe-OF mode, SAS port 0 is used for the Ethernet port A (first port), and the SAS port 1 is not used. The PCIe lanes 0 and 3 are used as a control plane for the first (port A) and second (port B) Ethernet attached NVMe-OF controllers, PCIe lane 1 is used for Ethernet port B (second port), and the PCIe lane 2 is not used. In some other configurations, when the NVMe-oF device 100 is operating in 50G (single port or dual port) or 100G (single port only) speed in the NVMe-oF mode, SAS port 0 is used for the Ethernet port A (first port) and the SAS port 1 is used as Ethernet port C (third port). The PCIe lanes 0 and 3 are used as a control plane for the first (port A) and second (port B) Ethernet attached NVMe-oF controllers, PCIe lane 1 is used for Ethernet port B (second port), and the PCIe lane 2 is used for Ethernet port D (fourth port).

In some configurations, if the product information is stored in a chassis, the two lanes (in a single port mode) or four lanes (in a dual port mode) of the PCIe bus on the U.2 connector 112 are driven by a PCIe engine. In this case, the multi-mode NVMe-OF device 100 may disable the Ethernet engine(s), and the NVMe protocols and functionalities are supported or enabled. If the product information is stored in an NVMe-oF chassis, the Ethernet attached NVMe-oF controllers use only PCIe lanes 1 and 2, and/or SAS pins depending on the design of the multi-mode NVMe-oF device.

In some cases, the product information used for self-configuration is stored in the chassis is a vital product data (VPD). During the start-up, the multi-mode NVMe-oF device 100 may retrieve the VPD from the chassis and configure itself based on the VPD. In some configurations, the multi-mode NVMe-oF device 100 can be configured in various manners without deviating from the scope of the present disclosure. For example, the multi-mode NVMe-oF device 100 can be configured by a control command over the PCIe bus issued by a BMC of the motherboard to which the multi-mode NVMe-oF device 100 is connected to. The present system provides a platform that may support various types of NVMe and NVMe-OF devices in non-high availability (non-HA) mode (i.e., single-path input/output (I/O)) or HA mode (i.e., multi-path I/O) with minimum hardware changes.

FIG. 4A (FIG. 4A.1 and FIG. 4A.2) illustrates a block diagram of an example NVMe-oF device 400 operating in a non-HA mode, according to one embodiment. The NVMe-OF device 400 may be the NVMe-OF device 100 of FIG. 1A. In this example, the NVMe-oF device 400 may support single-path I/Os and may be able to operate in different Ethernet speeds from 10G up to 100G, without any changes to the hardware. The NVMe-OF device 400 may include a FPGA 402, a first M.3 format SSD 414, a second M.3 format SSD 416, and two DDR4 memories (422 and 424). The FPGA 402 interfaces with the first M.3 format SSD 414 via a first PCIe X4 bus 418 and the FPGA 402 interfaces with the second M.3 format SSD 416 via a second PCIe X4 bus 420. The NVMe-oF device 400 is also connected to a U.2 connector 412, and via the U.2 connector 412, the NVMe-oF device 400 may support two SAS ports (SAS0 and SAS1) and up to four PCIe X4 lanes of a PCIe X4 bus. The two SAS ports (SAS0 and SAS1) may be used as Ethernet ports. The NVMe-oF device 400 may configure two PCIe lanes (PCIe 1 and PCIe 2) as Ethernet ports 406 (Ethernet port B) and 410 (Ethernet port D). The NVMe-oF device 400 may further configure the two SAS ports (SAS0 and SAS1) as Ethernet ports 404 (Ethernet port A) and 408 (Ethernet port C). The first 25G Ethernet port 404 may be connected at pins S2, S3, S5, and S6 of the U.2 connector 412, the second 25G Ethernet port 406 may be connected at pins S17, S18, S20, and S21 of the U.2 connector 412, the third 25G Ethernet port 408 may be connected at pins S9, S10, S12, and S13 of the U.2 connector 412, and the fourth 25G Ethernet port 410 may be connected at pins S23, S24, S26, and S27 of the U.2 connector 412.

In one configuration, the Ethernet ports 404, 406, 408, and 410, may be connected to a motherboard 401 over a mid-plane 426 via several high speed Molex connectors 428 that may collectively carry all the Ethernet ports 404, 406, 408, and 410 and other non-high speed control signals such as SMBus, reset, clock, etc. The motherboard 401 may include a local CPU 434, a BMC 432, an Ethernet switch controller 436, a PCIe switch 438, and two DDR4 memories (440 and 442). In some configurations, the motherboard 401 may push various signals to NVMe-oF device 400 and perform various services on NVMe-oF device 400 over the Ethernet ports 404, 406, 408, and 410, over the mid-plane 426. For example, the motherboard 401 may receive device-specific information from the NVMe-oF device 400 over the Ethernet ports 404, 406, 408, and 410, including, but not limited to, health status information, field-replaceable unit (FRU) information, and sensor information of the NVMe-oF device 400. The motherboard 401 may also perform various services over the Ethernet ports 404, 406, 408, and 410 including, but not limited to, discovery services to a BMC (e.g., BMC 432) or a local host CPU (e.g., CPU 434) and download services for a new eSSD firmware for performing a firmware upgrade.

FIG. 4B (FIG. 4B.1 and FIG. 4B.2) illustrates a block diagram of the example NVMe-oF device 400 of FIG. 4A operating in a HA mode, according to one embodiment. In this example, the NVMe-oF device 400 may support multi-path I/Os and may be able to operate in different Ethernet speeds from 10G up to 100G, without any changes to the hardware. In HA mode, NVMe-oF device 400 may be connected to two motherboards 401 and 403 to support multi I/O in a dual port configuration (in a HA mode) via the mid-plane 426. The mid-plane 426 is a common mid-plane that can support both a HA mode and a non-HA mode. Depending on the system configuration, signal integrity may need to be tested to ensure that the common mid-plane 426 may support for both configurations. If the signal integrity is not sufficient, the system can have two versions of mid-planes including the first mid-plane for the HA mode and the second mid-plane for the non-HA mode. E25 pin of the U.2 connector 412 can be used to enable the dual port configuration. The NVMe-oF device 400 can self-configure its operational mode using a physical pin (e.g., a presence pin (Pin E6) on the chassis of the motherboard (401 or 403)) or by an in-band command from a BMC (432 or 444) of the motherboard (401 or 403 not shown).

In one configuration, when operating in HA mode, the Ethernet port 404 (Ethernet port A) and Ethernet port 406 (Ethernet port B) of the NVMe-OF device 400 may be connected to the motherboard 401 over the mid-plane 426 via the high speed Molex connectors 428 that may collectively carry the Ethernet ports 404 and 406 and other non-high speed control signals such as SMBus, reset, clock, etc. Also, in HA mode, the Ethernet port 408 (Ethernet port C) and Ethernet port 410 (Ethernet port D), of the NVMe-oF device 400, may be connected to the second motherboard 403 (not shown) over the mid-plane 426 via several high speed Molex connectors 456 that may collectively carry the Ethernet ports 408 and 410 and other non-high speed control signals such as SMBus, reset, clock, etc. The second motherboard 403 may include a local CPU 446, a BMC 444, an Ethernet switch controller 448, a PCIe switch 450, and two DDR4 memories (452 and 454).

Because the multi-mode NVMe-oF device 400 may operate both in the NVMe and NVMe-oF modes, the cost for developing and deploying the devices may be reduced because the same devices may be used in the NVMe mode and the NVMe-oF mode. For the similar reason, the multi-mode NVMe-oF device 400 may have a faster time to the market. The multi-mode NVMe-oF device may be used in various products and chassis. The two lanes of the PCIe bus are reserved for standard features through a control plane. A CPU, a BMC, and other devices may use the two lanes of the PCIe bus as a control plane to communicate to each NVMe-OF device inside the chassis at no additional cost. The NVMe mid-plane may be used as unmodified, and there is no need for a new connector on the NVMe-oF device 400 due to the additional GPIO pins (e.g., ESpeed [1:0] 202 of FIG. 2) located on the mid-plane. Further, it is desirable for any platform system to support different types of NVMe-OF devices from different suppliers. By using common building blocks such as switch board, mid-plane and Ethernet SSDs, the different embodiments of the present application may enable the existing eco-system providers to go to market a lot faster and offer various price/performance products to satisfy various customers. It is also desirable to have a common system platform which is capable of supporting NVMe-OF devices with standard U.2 such as PM1725a or PM1735 and new emerging such as M.3 or NGSFF based SSDs.

Figure 5A:
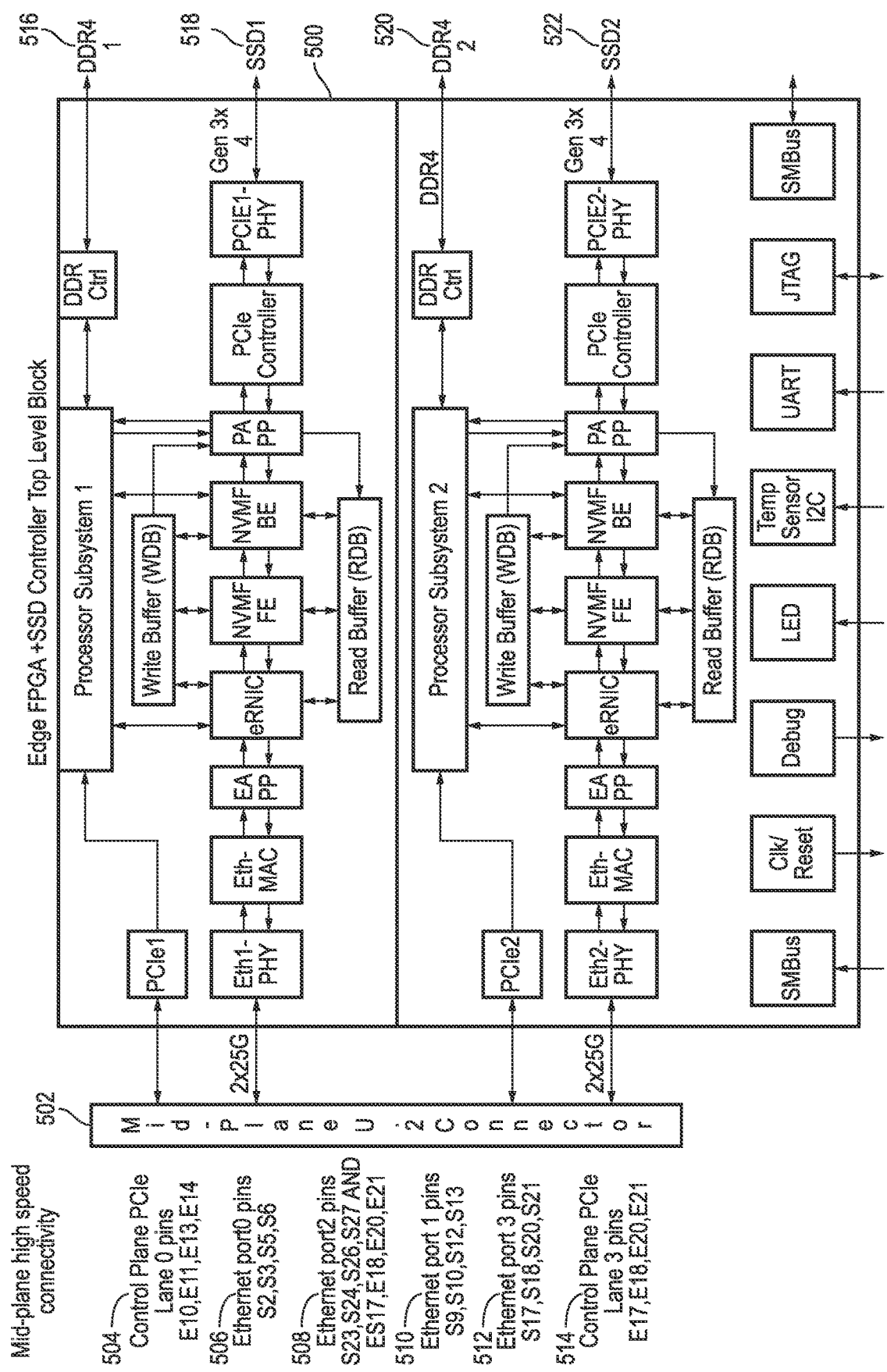
FIG. 5A illustrates a block diagram of an example field programmable gate array (FPGA) device, according to some example embodiments of the present invention.
Figure 5B:
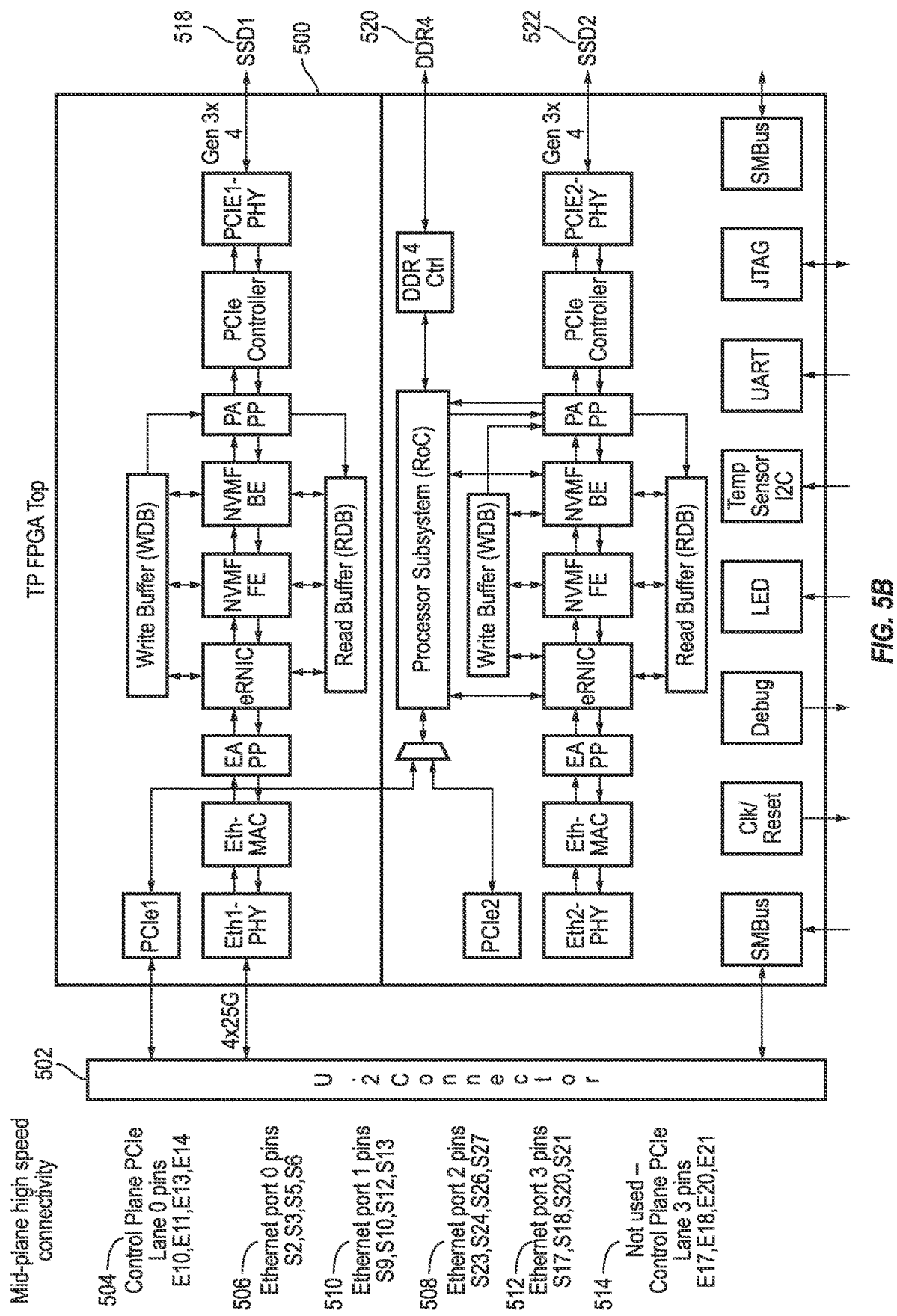
FIG. 5B illustrates another block diagram of an example FPGA device, according to some example embodiments of the present invention.

FIGS. 5A-5B are block diagrams illustrating an example FPGA device 500, according to one embodiment. The FPGA 500 may be FPGA 102 of FIG. 1A. The FPGA 500 may provide an interface between a U.2 connector 502 and a plurality of flash drives (e.g., the two M.3 SSDs (114, 116) of FIG. 1A). The FPGA 500 may also be connected to a plurality of DDR4 memories (e.g., the two DDR4 memories (122 and 124) of FIG. 1A). For example, the FPGA 500 may interface with a first SSD (e.g., 114 of FIG. 1A) via a port 518 which may be connected to a PCIe X4 bus (e.g., a first PCIe X4 bus 118 of FIG. 1A), and the FPGA 500 may interface with a second SSD (e.g., 116 of FIG. 1A) via a port 522 which may be connected to another PCIe X4 bus (e.g., a second PCIe X4 bus 120 of FIG. 1A). The FPGA 500 may also be connected with a first DDR4 memory (e.g., 122 of FIG. 1A) via port 516 and a second DDR4 memory (e.g., 124 of FIG. 1A) via port 520.

The U.2 connector 502, connected to the FPGA 500, may support two SAS ports (SAS0 and SAS1) and up to four PCIe X4 lanes of a PCIe X4 bus. The two SAS ports (SAS0 and SAS1) may be used as Ethernet ports. In the NVMe-oF mode, the two PCIe lanes (PCIe 1 and PCIe 2) may be configured as Ethernet port 510 (Ethernet port 1) and Ethernet port 512 (Ethernet port 3). In the NVMe-oF mode, the two SAS ports (SAS0 and SAS1) may be configured as Ethernet port 506 (Ethernet port 0) and Ethernet port 508 (Ethernet port 2). The Ethernet port 506 (Ethernet port 0) may be connected at pins S2, S3, S5, and S6 of the U.2 connector 502, the Ethernet port 510 (Ethernet port 1) may be connected at pins S9, S10, S12, and S13 of the U.2 connector 502, the Ethernet port 508 (Ethernet port 2) may be connected at pins S23, S24, S26, and S27 of the U.2 connector 502, and the Ethernet port 512 (Ethernet port 3) may be connected at pins S17, S18, S20, and S21 of the U.2 connector 502.

In one configuration, in NVMe-oF mode, the two X1 PCIe lanes (PCIe 0 and PCIe 3) 504 and 514 of the U.2 connector 502 may be configured for control plane for the first (port 0) and second (port 1) Ethernet NVMe-of controllers. The control plane PCIe lane (PCIe 0) 504 may be connected at pins E10, E11, E13, and E14 of the U.2 connector 502 and the control plane PCIe lane 514 (PCIe 3) may be connected at pins E17, E18, E20, and E21 of the U.2 connector 502. In some configurations, as shown in FIG. 5A, in NVMe-oF mode, when the FPGA 500 is operating in 50G (single port or dual port) speed, SAS port 0 is used for the Ethernet port 0 (Ethernet port 506) and the SAS port 1 is used as Ethernet port 2 (Ethernet port 508). The PCIe lane 504 (PCIe 0) and PCIe lane 514 (PCIe 3) are used as control planes, PCIe lane 1 (Ethernet port 510) is used for Ethernet port 1, and the PCIe lane 2 (Ethernet port 512) is used for Ethernet port 3.

In another configuration, as shown in FIG. 5B, in NVMe-oF mode, when the FPGA 500 is operating in 100G (single port) speed, SAS port 0 is used for the Ethernet port 0 (Ethernet port 506) and the SAS port 1 is used as Ethernet port 2 (Ethernet port 508). The PCIe lane 504 (PCIe 0) is used as a control plane, PCIe lane 1 (port 510) is used for Ethernet port 1, and the PCIe lane 2 (port 512) is used for Ethernet port 3. The control plane PCIe lane 514 (PCIe 3) is not used.

In some configurations, the ports 504-514 may be connected to a motherboard (e.g., 401 or 403 of FIGS. 4A and 4B) over a mid-plane (e.g., 426 of FIGS. 4A and 4B) depending on the mode of operation of the SSDs attached to the FPGA 500. In some configurations, the FPGA 500 may function as an NVMe target and obviates the need for an X86-based CPU on a motherboard in the target device. For an NVMe-oF-based system, an X86-based CPU on a motherboard is no longer required to move data between an initiator (e.g., host software) and a target device (i.e., an NVMe-oF device) because the target device is capable of moving data by itself. Also, the different operating speeds of the plurality of flash drives (e.g., the two M.3 format SSDs (114, 116) of FIG. 1A) connected to the FPGA 500 may be accomplished by using two additional GPIO (ESpeed [1:0]) pins (e.g., pins 202 of FIG. 2) located on the mid-plane or CPLD (e.g., 204 of FIG. 2), which may be controlled by one or more internal registers inside the FPGA 500.

In one embodiment, when an Ethernet packet is received at the FPGA 500, the logical blocks inside of the FPGA 500 may participate in peeling off the various layers of header in that Ethernet packet. For example, inside the Ethernet packet, there may be a TCP or UDP packet, inside the TCP or UDP packet there may be an RDMA packet, inside the RDMA packet there may be an NVMe-oF packet, and inside the NVMe-OF packet there may be an NVMe command. The logical blocks inside the FPGA 500 may represent various layers where the Ethernet packet is peeled back to expose the next layer of protocol. The flash drives or SSDs that are connected to the FPGA 500 via ports 518 and 522 may consume the NVMe command as if it had been connected to the host or motherboard on the other end of the Ethernet ports 506, 508, 510, and 512 via the U.2 connector 502.

Figure 6:
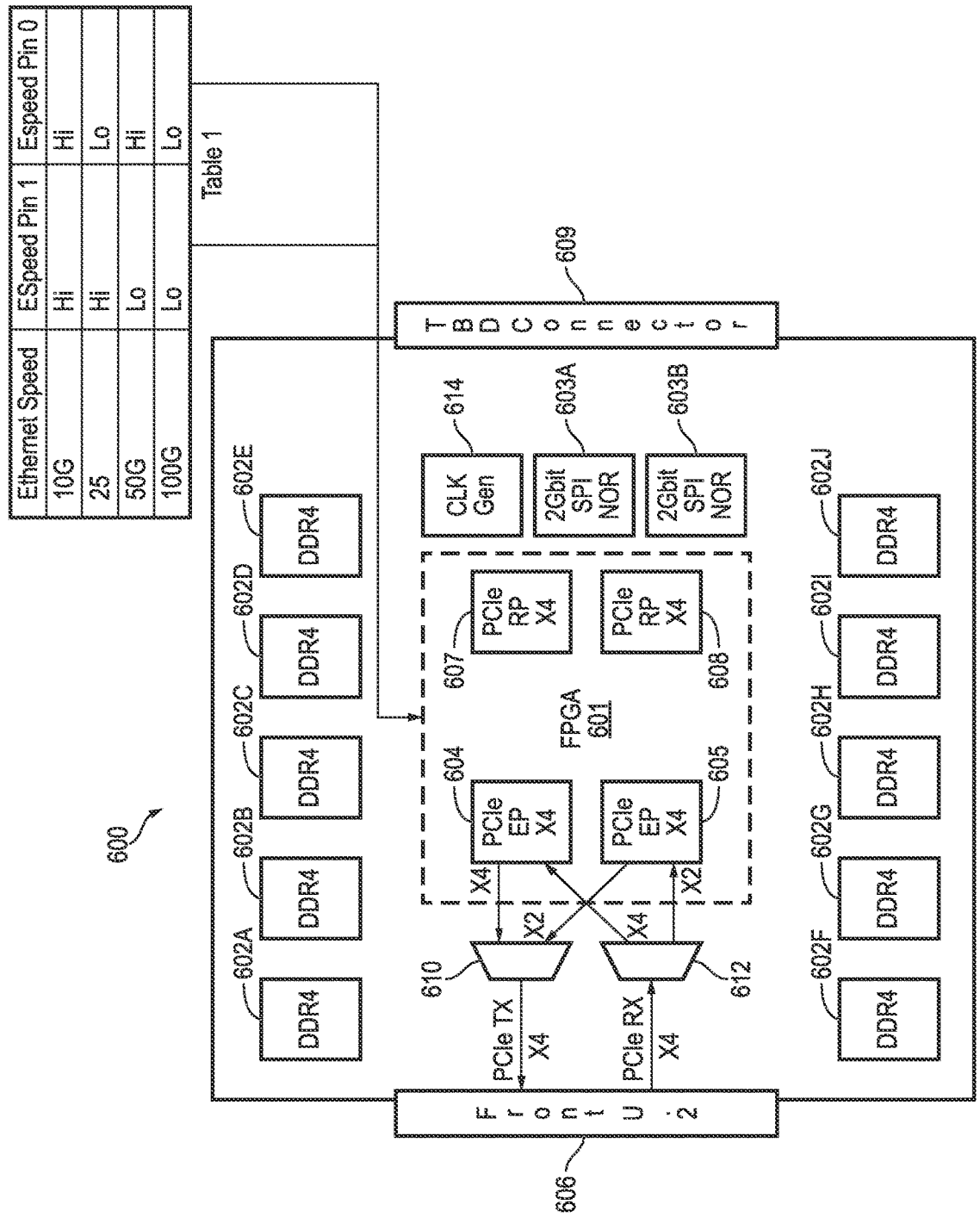
FIG. 6 illustrates yet another block diagram of an example FPGA device, according to some example embodiments of the present invention.

FIG. 6 is a block diagram illustrating an example FPGA device 600, according to one embodiment. The FPGA device 600 may include a FPGA 601. The FPGA 601 may provide an interface between a U.2 connector 606 and a plurality of flash drives, for example, 603A and 603B. For example, the FPGA 601 may interface with the flash drive 603A via a port 607 which may be connected to a PCIe X4 bus, and the FPGA 601 may interface with the flash drive 603B via a port 608 which may be connected to another PCIe X4 bus. The FPGA 601 may also be connected to a plurality of DDR4 memories, for example, 602A-602J. The FPGA 601 is also connected to a clock circuit 614.

The U.2 connector 606, may be connected to the FPGA 601, via two PCIe X4 busses 604 and 605 through two multiplexers 610 and 612. The PCIe X4 bus 604 may be used to transmit signal or packets to a motherboard over a mid-plane via U.2 connector 606 through multiplexer 610, and the PCIe X4 bus 605 may be used to receive packets from a motherboard over a mid-plane via U.2 connector 606 through multiplexer 612. In some configurations, the different operating speeds of the plurality of flash drives, for example, 603A and 603B connected to the FPGA 601 may be accomplished by using two additional GPIO (ESpeed [1:0]) pins (e.g., pins 202 of FIG. 2) located on the mid-plane or CPLD (e.g., 204 of FIG. 2), which may be controlled by one or more internal registers inside the FPGA 601. Table 1 illustrates the status of ESpeed pins during different operating speeds of the flash drives 603A and 603B connected to the FPGA 601.

Figure 7:
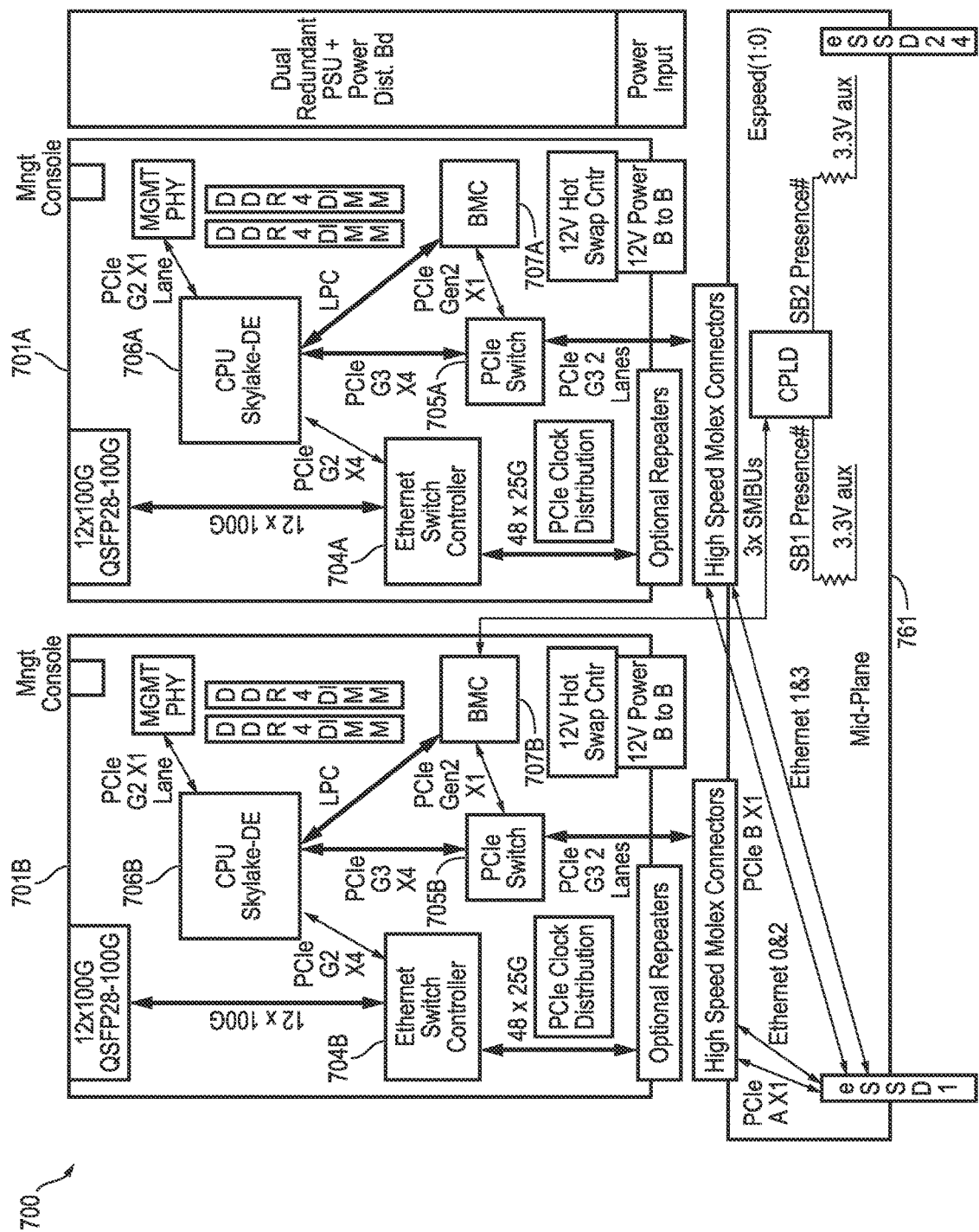
FIG. 7 illustrates a block diagram of an example switch, according to some example embodiments of the present invention.

FIG. 7 is a block diagram illustrating an example switch including two motherboards, according to one embodiment. The switch 700 includes two motherboards 701A and 701B to support multi I/O in a dual port configuration (in a HA mode) via a mid-plane 761. The motherboard 701A includes an Ethernet switch 704A and a PCIe switch 705A, and the motherboard 701B includes an Ethernet switch 704B and a PCIe switch 705B. Each of the motherboards 701A and 701B can include other components and modules, for example, a local CPU (706A, 706B), a BMC (707A, 707B), etc. as shown in the example motherboard 401 shown in FIG. 4A.

Several eSSDs can be plugged into device ports of the switch 700. For example, each of the eSSDs is connected to the switch 700 using a U.2 connector. Each eSSD can connect to both the motherboard 701A and the motherboard 701B. In the present example, the eSSDs plugged into the switch 700 are configured as an NVMe-OF device requiring connectivity to the switch 700 over the mid-plane 761 via the PCIe bus and Ethernet ports.

Figure 8:
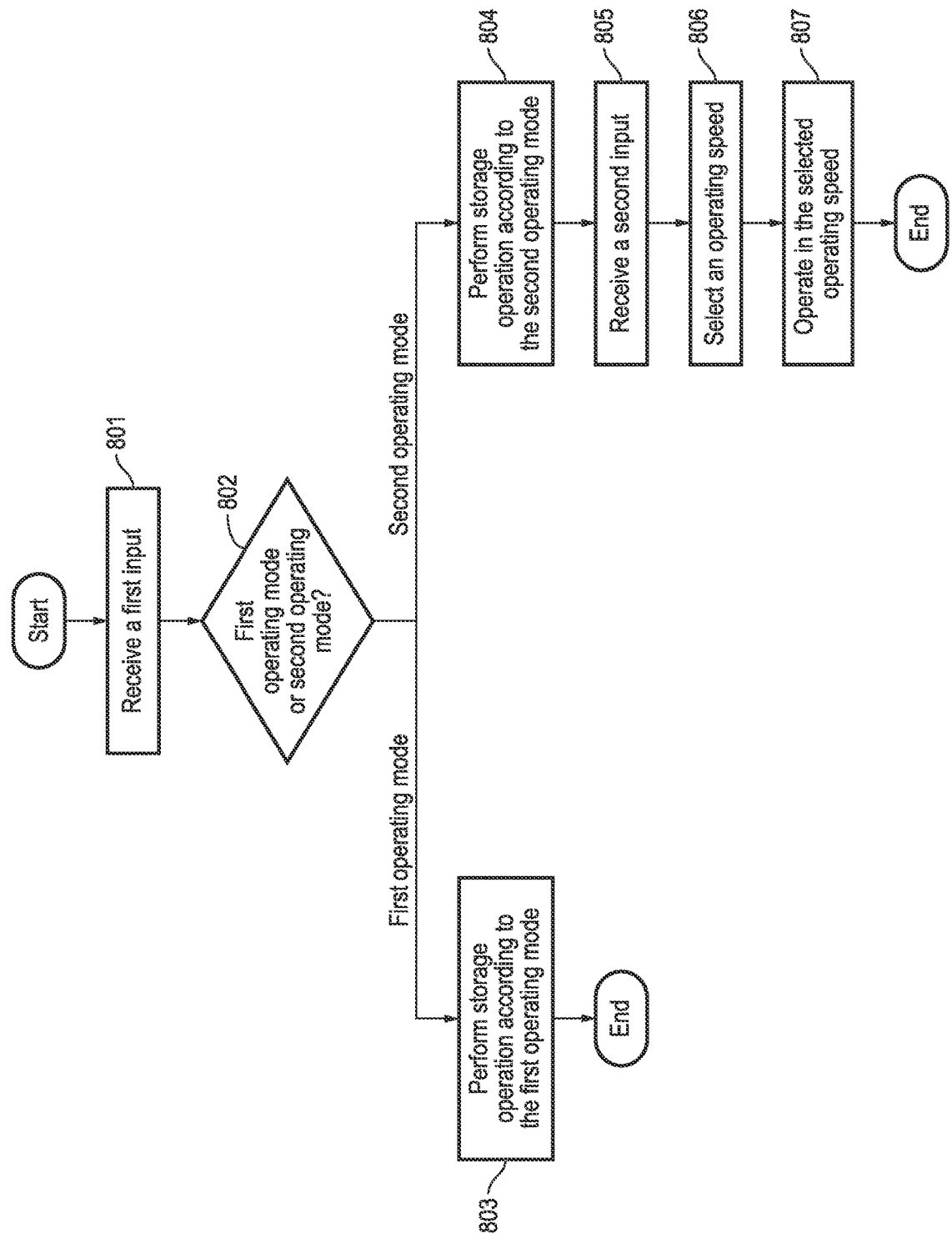
FIG. 8 illustrates a flow chart of a method for operating a storage device, according to some example embodiments of the present invention.

FIG. 8 is a flow chart of a method for operating a storage device, according to an embodiment of the present invention. The storage device may the NVMe-oF device 400 of FIG. 4A.

At 801, the storage device receives a first input. The storage device may receive the first input from a motherboard or a BMC via a plurality of device ports over a mid-plane. For example, the NVMe-oF device 400 may receive a first input from the motherboard 401 or BMC 432 via device ports 404-406 over a mid-plane 426 of FIG. 4A.

In one configuration, the first input may be controlled by using a physical pin on a chassis of the motherboard or by an in-band command from the BMC. For example, the first input received at the NVMe-oF device 400 may be controlled by using a physical pin (E6) on the chassis of the motherboard 401 of FIG. 4A.

At 802, based on the first input, the storage device determines whether to operate in a first operating mode or in a second operating mode. In one configuration, the first operating mode and the second operating mode of the storage device may be NVMe mode and NVMe-OF mode. For example, based on the first input, the NVMe-oF device 400 determines whether to operate in the NVMe mode or the NVMe-oF mode.

At 802, based on the first input, if the storage device determines to operate in the first operating mode, at 803, the storage device performs storage operations according to the first operating mode. For example, if based on the first input, the NVMe-oF device 400 determines to operate in the NVMe mode, the NVMe-oF device 400 performs storage operations according to the NVMe protocol.

However, if at 802, based on the first input, the storage device determines to operate in the second operating mode, at 804, the storage device performs storage operations according to the second operating mode. For example, if based on the first input, the NVMe-OF device 400 determines to operate in the NVMe-oF mode, the NVMe-OF device 400 performs storage operations according to the NVMe-oF protocol.

At 805, when operating in the second operating mode, the storage device receives a second input. The storage device may receive the second input from the mid-plane via the plurality of device ports. For example, while operating in the NVMe-oF mode, the NVMe-oF device 400 may receive a second input from the mid-plane 426 via the plurality of device ports 404-406 of FIG. 4A.

In one configuration, the second input is controlled by using two GPIO pins located on the mid-plane and controlled by the BMC or a local CPU of the motherboard, or one or more internal registers inside the FPGA of the storage device. For example, the second input may be controlled by using two GPIO pins (e.g., (ESpeed [1:0]) pins 202 of FIG. 2) located on the mid-plane 426 controlled by the BMC 432 or a local CPU 434 of the motherboard 401, or one or more internal registers inside the FPGA 402 of the NVMe-oF device 400 of FIG. 4A.

At 806, based on the second input, the storage device selects an operating speed from a plurality of operating speeds for the storage device. For example, based on the second input, the NVMe-oF device 400 selects an operating speed from a plurality of operating speeds for the storage device. For example, while operating in the NVMe-oF mode, based on the second input, the NVMe-oF device 400 selects an operating speed of 100G. In one configuration, the plurality of operating speeds of the storage device may be any number of speeds between 10G and 100G.

At 807, while operating in the second mode, the storage device operates in the selected operating speed. For example, while operating in the NVMe-OF mode, the NVMe-oF device 400 operates in the operating speed of 100G.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for supporting multi-mode and/or multi-speed NVMe-oF devices have been specifically described and illustrated herein, many modifications and variations will be apparent to those skilled in the art. Accordingly, it is to be understood that a system and method for supporting multi-mode and/or multi-speed NVMe-oF devices constructed according to principles of this invention may be embodied other than as specifically described herein. The invention is also defined in the following claims, and equivalents thereof.

What is claimed is:

1. A system comprising:
   a controller; and
   a storage device comprising a solid state drive (SSD) connected to the controller via a mid-plane,
   wherein the storage device operates in a first protocol or a second protocol based on a first input received from the controller via one or more device ports over the mid-plane, and
   wherein in the first protocol, the SSD of the storage device selects a first operating speed from among two or more operating speeds above a predetermined threshold speed available during the first protocol based on a second input received from the controller via the one or more device ports.

2. The system of claim 1, wherein the storage device further comprises a field programmable gate array (FPGA) in communication with the SSD of the storage device via a connector and a bus.

3. The system of claim 2, wherein the connector is a SSD connector and the bus is a peripheral component interconnect express (PCIe) bus.

4. The system of claim 1, wherein the SSD is connected to the mid-plane via a small form factor (SFF) connector and the controller is a baseband management controller (BMC).

5. The system of claim 1, wherein the first input is determined by a physical pin on a chassis of a motherboard connected to the mid-plane or by an in-band command from the controller.

6. The system of claim 1, wherein the second input is determined by one or more general-purpose input/output (GPIO) pins controlled by the controller or a local central processing unit (CPU) of a motherboard connected to the mid-plane, or one or more registers associated with a field programmable gate array (FPGA) of the storage device.

7. The system of claim 1, wherein the first protocol is a non-volatile memory express (NVMe) protocol and the second protocol is a NVMe over fabrics (NVMe-oF) protocol.

8. The system of claim 1, wherein the one or more device ports are connected to the storage device via a U.2 connector and the storage device operates in a high-availability (HA) mode.

9. The system of claim 8, wherein the storage device supports, via the U.2 connector, one or more Serial Attached Small Computer System Interface (SAS) ports and one or more peripheral component interconnect express (PCIe) X4 lanes of a PCIe X4 bus, wherein the one or more SAS ports are used as one or more Fabric attached ports, and wherein the one or more Fabric attached ports comprise Ethernet ports, Fibre-channel ports, or InfiniBand ports.

10. The system of claim 9, wherein in the second protocol, the storage device supports, via the U.2 connector, at least two PCIe X4 lanes of the one or more PCIe X4 lanes for control plane for the one or more Fabric attached ports and remaining PCIe X4 lanes of the one or more PCIe X4 lanes as additional Fabric attached ports.

11. The system of claim 1, wherein the storage device further comprises a first storage device and a second storage device, wherein the first storage device or the second storage device operates in accordance with the first protocol or the second protocol at the first operating speed or at a second operating speed from the two or more operating speeds.

12. A method comprising:
receiving, at a storage device comprising a solid state drive (SSD), a first input from a controller connected to the storage device via one or more device ports over a mid-plane, wherein the storage device operates in a first protocol or a second protocol based on the first input;
in the second protocol, receiving, at the storage device, a second input from the mid-plane via the one or more device ports; and
selecting, by the SSD of the storage device, an operating speed of the storage device from among two or more operating speeds above a predetermined threshold speed available during the second protocol based on the second input.

13. The method of claim 12, wherein the SSD is connected to the mid-plane via a small form factor (SFF) connector and the controller is a baseband management controller (BMC).

14. The method of claim 12, wherein the first input is determined by a physical pin on a chassis of a motherboard connected to the mid-plane or by an in-band command from the controller.

15. The method of claim 12, wherein the second input is determined by one or more general-purpose input/output (GPIO) pins controlled by the controller or a local central processing unit (CPU) of a motherboard connected to the mid-plane, or one or more registers associated with a field programmable gate array (FPGA) of the storage device, the FPGA being in communication with the SSD via a connector and a bus.

16. The method of claim 12, wherein the first protocol is a non-volatile memory express (NVMe) protocol and the second protocol is a NVMe over fabrics (NVMe-oF) protocol.

17. A storage device comprising:
a solid state drive (SSD) in communication with a field programmable gate array (FPGA) via a first connector and a bus,
wherein the storage device operates in a first protocol or a second protocol based on a first input received via a second connector, and
wherein in the first protocol, the SSD of the storage device selects a first operating speed from among two or more operating speeds above a predetermined threshold speed available during the second protocol based on a second input received via the second connector.

18. The storage device of claim 17, wherein the first input is received from a motherboard or a controller connected to the storage device via one or more device ports over a mid-plane and the second input is received from the mid-plane via the one or more device ports,
wherein the first input is determined by a physical pin on a chassis of the motherboard or by an in-band command from the controller and the second input is determined by one or more general-purpose input/output (GPIO) pins controlled by the controller or a local central processing unit (CPU) of the motherboard, or one or more registers associated with the FPGA, and
wherein the SSD is connected to the mid-plane via a small form factor (SFF) connector.

19. The storage device of claim 17, wherein the first connector is a SSD connector, the bus is a peripheral component interconnect express (PCIe) bus, the second connector is a U.2 connector, and the first protocol is a non-volatile memory express (NVMe) protocol and the second protocol is a NVMe over fabrics (NVMe-oF) protocol.

20. The storage device of claim 17, wherein the storage device further comprises a first storage device and a second storage device, wherein the first storage device or the second storage device operates in accordance with the first protocol or the second protocol at the first operating speed or at a second operating speed from the two or more operating speeds.

21. The system of claim 1, wherein the selected first operating speed corresponds to a combination of pin values at a pin in the mid-plane and Ethernet speeds available to the SSD.

* * * * *